(12) United States Patent
Bilak et al.

(10) Patent No.: US 7,681,509 B2
(45) Date of Patent: Mar. 23, 2010

(54) SUBTERRANEAN MATERIAL DISPENSING APPARATUS AND METHOD

(75) Inventors: Ronald Edward Bilak, Seneca Falls, NY (US); Mark Ronald Bilak, Fuquay-Varina, NC (US)

(73) Assignee: B&B Innovators, LLC, Fuquay-Varina, NC (US)

( * ) Notice: Subject to any disclaimer, the term of this patent is extended or adjusted under 35 U.S.C. 154(b) by 169 days.

(21) Appl. No.: 11/838,709

(22) Filed: Aug. 14, 2007

(65) Prior Publication Data
US 2009/0044975 A1    Feb. 19, 2009

(51) Int. Cl.
*A01C 5/00* (2006.01)
*A01C 5/02* (2006.01)
*A01C 15/00* (2006.01)
*A01C 23/00* (2006.01)
*A01C 23/02* (2006.01)

(52) U.S. Cl. .......................... 111/7.2; 111/128; 111/90; 111/91; 111/92; 111/200; 111/900; 111/906

(58) Field of Classification Search ................. 111/128, 111/115–117, 91, 99, 900, 200, 118, 7.1–7.3, 111/121, 89, 90, 92, 906
See application file for complete search history.

(56) References Cited

U.S. PATENT DOCUMENTS

| | | | |
|---|---|---|---|
| 551,527 A * | 12/1895 | Cunningham | 239/271 |
| 4,021,965 A | 5/1977 | Norris | |
| 4,989,366 A | 2/1991 | DeVlieger | |
| 5,133,625 A * | 7/1992 | Albergo et al. | 405/263 |
| 5,413,280 A | 5/1995 | Taylor | |
| 5,431,115 A | 7/1995 | Auer | |
| 5,692,338 A | 12/1997 | Rose | |
| 5,836,106 A * | 11/1998 | Alex | 47/48.5 |
| 6,453,607 B1 | 9/2002 | Dewey | |
| 6,843,020 B2 | 1/2005 | Lutz | |
| 2004/0098910 A1 | 5/2004 | Lutz | |
| 2007/0050958 A1 * | 3/2007 | Scruggs | 27/2 |

OTHER PUBLICATIONS

Derwent-ACC-No. 2001-610899; Brady et al., Method for controlled release of active agent such as anti-fouling agent, to plywood surface contacted with water, comprising exposing an environment to composition comprising tubules containing the active agent in its lumen.*

* cited by examiner

*Primary Examiner*—Christopher J. Novosad
(74) *Attorney, Agent, or Firm*—Mark R. Bilak

(57) ABSTRACT

A material dispensing device delivers material directly into the ground. According to one embodiment of the material dispensing device, the device comprises an elongated hollow shaft, a receptacle, a helical flange and on or more openings formed in the shaft or helical flanges. The receptacle is disposed adjacent one end of the shaft for holding material. The receptacle is communicatively open to the shaft such that the material or a liquid-material mixture dissolved from at least a portion of the material can flow from the receptacle into the shaft. The helical flange is secured to the shaft. The shaft and helical flange are configured such that rotation of the shaft and flange causes the material dispensing device to be driven into the ground. The one or more openings formed in the shaft or helical flange disperse the material or the liquid-material mixture into the ground.

18 Claims, 5 Drawing Sheets

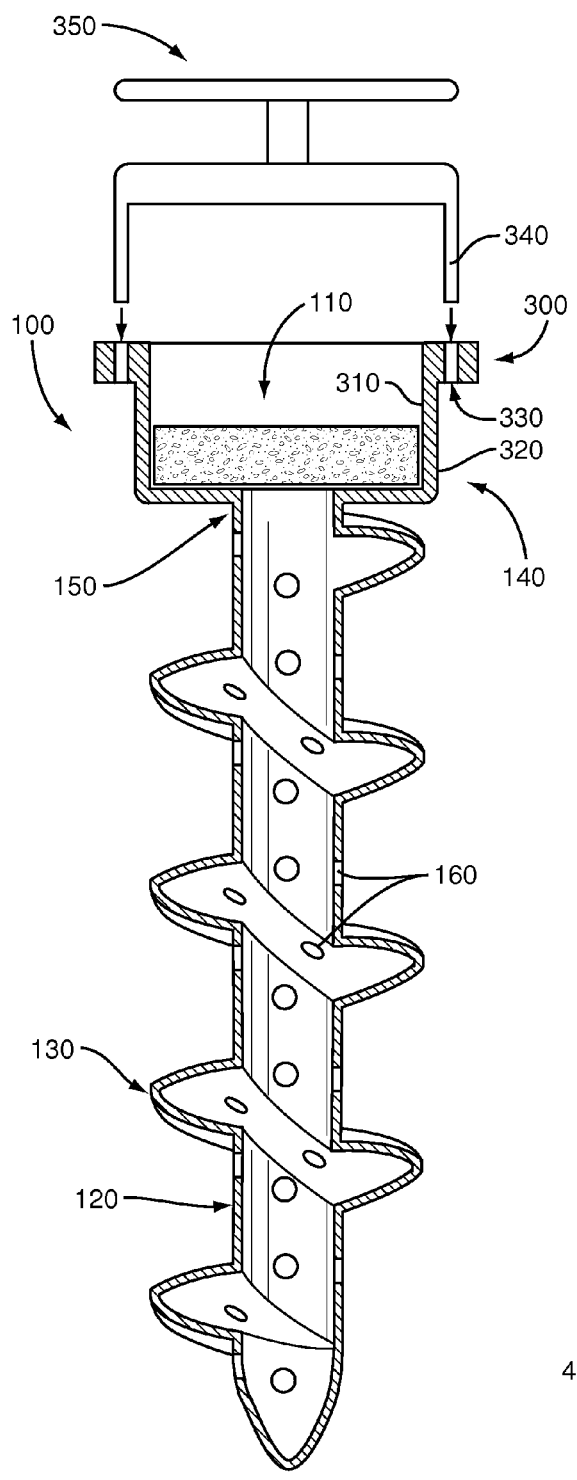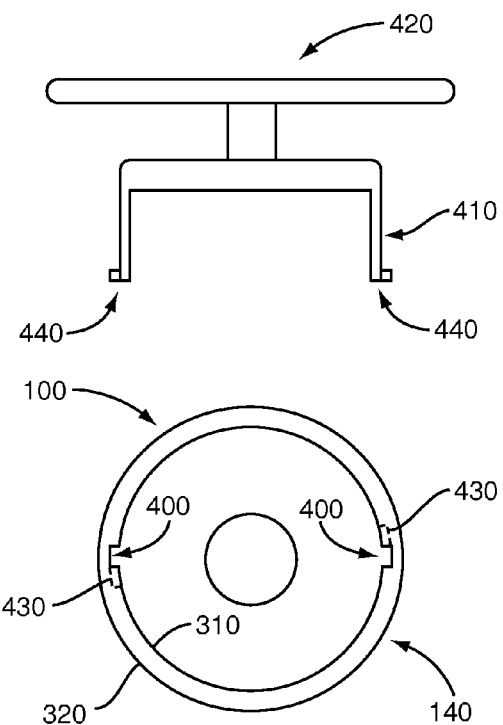
FIG. 3
FIG. 4

SUBTERRANEAN MATERIAL DISPENSING APPARATUS AND METHOD

BACKGROUND

The present invention generally relates to dispersing material into the ground.

Materials such as fertilizer or other soil amendments are conventionally applied to the surface of the ground using a spreader or other similar device. Applying a material such as fertilizer to the ground surface limits the depth to which the fertilizer can penetrate the ground below the surface. Fertilizer dispersed above the ground is less likely to amend the soil at appreciable depths. To achieve deep fertilization, additional fertilizer must be spread over the ground surface which can become cost prohibitive. This is particularly true for soils that are less penetrable such as clay and when deep soil amendments are desired, e.g., to fertilize deep root systems.

Above the ground material delivery systems also increase the likelihood that the material being dispensed will run-off into nearby streams, lakes or other bodies of water before substantially penetrating the ground. Runoff containing fertilizer or other soil amendments applied to the ground surface increases water pollution. The Clean Water Act in the United States prohibits direct channeling of runoff into bodies of water to reduce water pollution caused in part by surface pollutants such as fertilizer or other soil amendments.

Some conventional fertilizer dispensing devices deliver fertilizer directly into the ground. One conventional subterranean device is a spike made of fertilizer material. Conventional fertilizer spikes are hammered into the ground and dissolve over time to deliver fertilizer below ground. However, spikes made of fertilizer are relatively short and are difficult to drive into hard ground, thus limiting their use to workable soils and relatively short depths. Further, conventional fertilizer spikes are not refillable since the entire spike is made of fertilizer which eventually dissolves completely into the ground.

Other conventional subterranean fertilizer delivery systems have a hollow plastic spike with a cap covering the spike. Some cap types are removable so that fertilizer may be periodically re-added to the hollow spike. Conventional hollow fertilizer spikes are hammered into the ground, allowing the fertilizer contained therein to dissolve gradually over time into the ground through holes formed in the spike. Conventional hollow fertilizer spikes are also relatively short and thus have limited soil penetration depth. Thus, the soil is amended at only short depths. Further, the hollow spikes tend to be narrow, reducing the amount of lateral dispersion of fertilizer from the spike into the ground. Although some conventional hollow fertilizer spikes are refillable, they are difficult to locate after placement in the ground due to their narrowness. Also, it is difficult to re-fill the narrow spikes without spilling fertilizer.

SUMMARY

The methods and apparatus taught herein provide a material dispensing device for delivering material directly into the ground. The device includes an elongated hollow shaft with a helical flange secured thereto. The device is driven into the ground by rotating the shaft and flange. The helical flange-shaft arrangement allows for deep ground penetration. In various embodiments, the device has a mechanism for receiving a tool operable to rotate the shaft and helical flange.

The material dispensing device also has a receptacle attached to one end of the hollow shaft. Material to be dispersed into the ground is placed in the receptacle. In some embodiments, the material is a fertilizer. In other embodiments, the material contains a copper compound or derivative and is used for retarding root growth, e.g., near septic tanks, foundations, etc. Still other kinds of materials may be placed in the receptacle. Regardless, the material or a liquid-material mixture dissolved from at least a portion of the material flows from the receptacle into the hollow shaft. The material or the liquid-material mixture is dispersed into the ground through one or more openings formed in the shaft and/or helical flange.

According to one embodiment of the material dispensing device, the device comprises an elongated hollow shaft, a receptacle, a helical flange and one or more openings formed in the shaft or helical flange. The receptacle is disposed adjacent one end of the shaft for holding material. The receptacle is communicatively open to the shaft such that the material or a liquid-material mixture dissolved from at least a portion of the material can flow from the receptacle into the shaft. The helical flange is secured to the shaft. The shaft and helical flange are configured such that rotation of the shaft and flange drives the material dispensing device into the ground. The one or more openings formed in the shaft or helical flange disperse the material or the liquid-material mixture into the ground.

Of course, the present invention is not limited to the above features and advantages. Those skilled in the art will recognize additional features and advantages upon reading the following detailed description, and upon viewing the accompanying drawings.

DRAWING DESCRIPTIONS

FIG. 3 illustrates a cross-sectional view of another embodiment of the material dispensing device of FIG. 1.

FIG. 4 illustrates a plan view of another embodiment of the material dispensing device of FIG. 1.

WRITTEN DESCRIPTION

Figure 1:
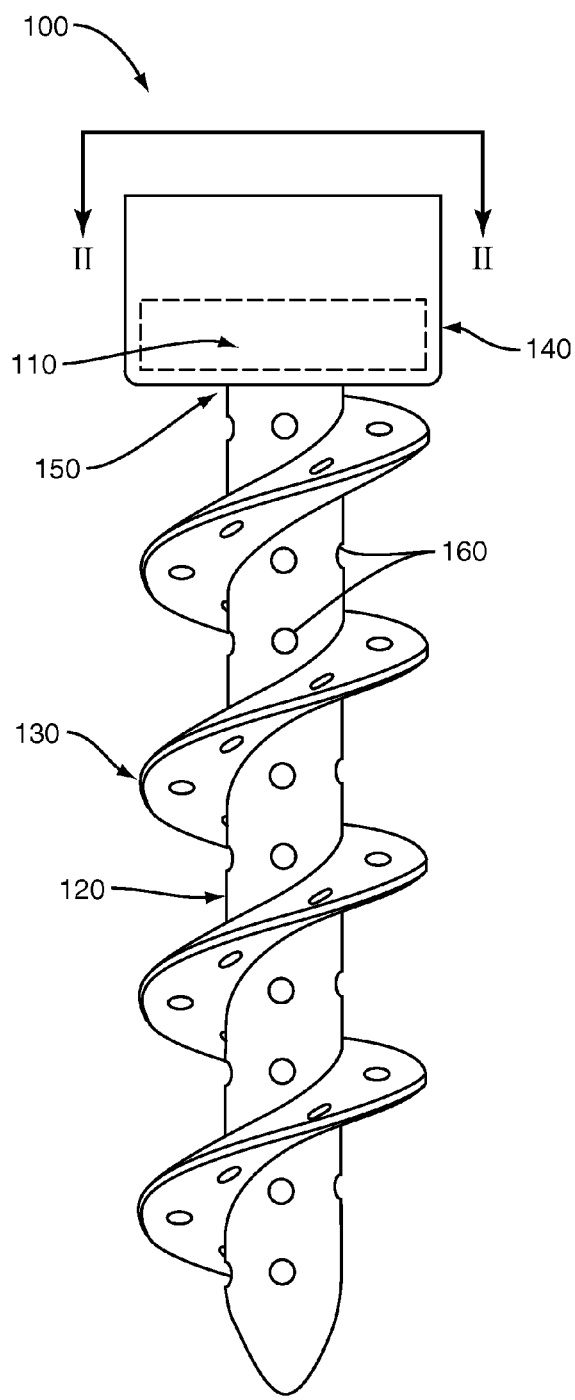
FIG. 1 illustrates an exterior view of an embodiment of a material dispensing device for dispersing material into the ground.
Figure 2:
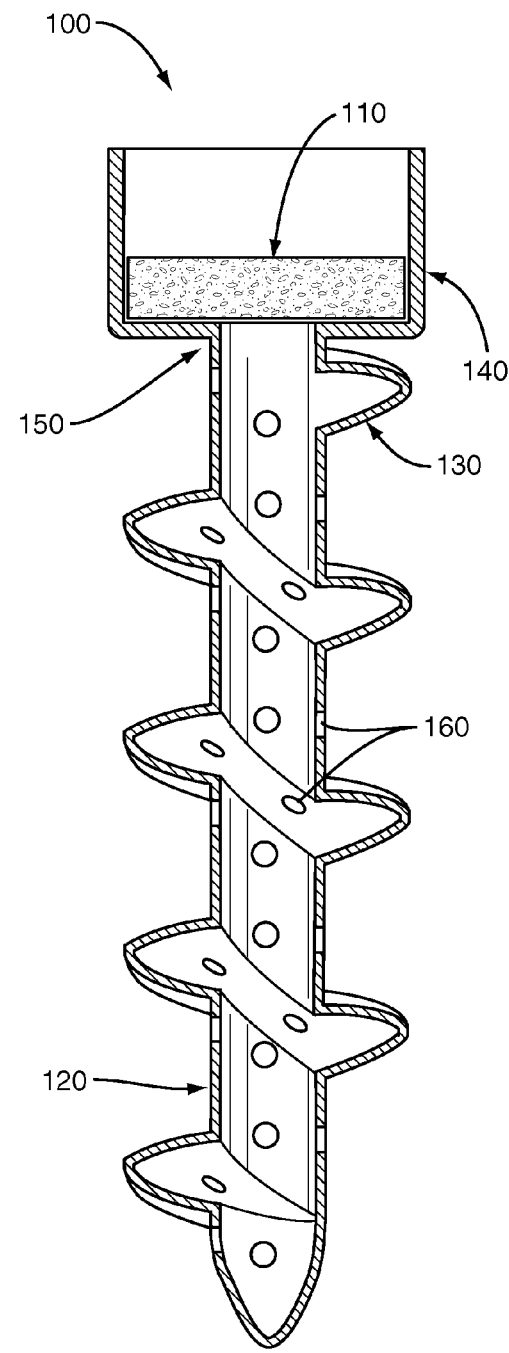
FIG. 2 illustrates a cross-sectional view of the material dispensing device of FIG. 1.

FIG. 1 illustrates an embodiment of a material dispensing device 100 for dispersing material 110 or a liquid-material mixture (not shown) dissolved from at least a portion of the material 110 into the ground (not shown). FIG. 2 illustrates a cross-sectional view of the material dispensing device 100 along line II in FIG. 1. The material dispensing device 100 includes an elongated hollow shaft 120 having a helical flange 130 secured to the shaft 120. In one embodiment, the shaft 120 and helical flange 130 are integrally formed, e.g., via an injection molding process. Regardless, the material dispensing device 100 is driven into the ground by rotating the shaft 120 and helical flange 130. A receptacle 140 for holding material 110 is disposed adjacent one end 150 of the shaft 120.

The receptacle 140 is communicatively open to the shaft 120 as shown in FIG. 2 such that the material 110 can flow from the receptacle 140 into the shaft 120 through the hollow end 150 of the shaft 120 adjacent the receptacle 140 when the material is in particulate form. Alternatively, a liquid-material mixture dissolved from at least a portion of the material 110 flows from the receptacle 140 into the shaft 120 when the material 110 is in a solid conglomerate or cake form as shown in FIG. 2. Either way, one or more openings 160 formed in the shaft 120 and/or helical flange 130 allow the material 110 or the liquid-material mixture to disperse into the ground. Screening (not shown) or other device may cover the openings 160 to limit the amount of soil entering the shaft 120 and helical flange 130 when driven into the ground. Alternatively, the openings 160 may be sized to limit the amount of soil entering the shaft 120 and helical flange 130.

According to various embodiments, the material dispensing device 100 receives a tool for driving the shaft 120 and helical flange 130 into the ground. FIG. 3 illustrates a cross-sectional view along line II in FIG. 1 of one embodiment of the material dispensing device 100 where the device 100 includes a tool receiving mechanism comprising one or more protrusions 300 disposed adjacent an inner sidewall surface 310 or an outer sidewall surface 320 of the receptacle 140. The protrusions 300, which have a hollow center region 330 for receiving an end 340 of a tool 350, engage the tool end 340 when inserted in the hollow center region 330 of the protrusions 300. This way, the shaft 120 and flange 130 may be driven into the ground by rotating the tool 350 in the appropriate direction.

FIG. 4 illustrates a plan view of another embodiment of the material dispensing device 100 including a tool receiving mechanism comprising one or more grooves 400 disposed in the inner or outer sidewall surface 310, 320 of the receptacle 140. The grooves 400 may be of any shape suitable for receiving an end 410 of a tool 420 when inserted in the grooves 400, e.g., v-shaped, rectangular, irregularly shaped, etc. The shaft 120 and flange 130 are driven into the ground by rotating the tool 420.

An optional slot 430 may be formed in the sidewall surface 310, 320 having the grooves 400. Each slot 430 is disposed adjacent one of the grooves 400 and prevents removal of the tool end 410 from the groove 400 after the tool 420 has been inserted in the grooves 400 and rotated in a first direction. According to this embodiment, the end of the tool 410 has one or more protrusions 440 shaped for insertion in the slots 430 upon rotation of the tool 420 after the tool end 410 has been inserted in the grooves 400. The slots 430 correspondingly receive the protrusions 440, preventing vertical removal of the tool end 410 unless the tool 420 is rotated in the opposite direction and the protrusions 440 are freed from the slots 430.

Figure 5:
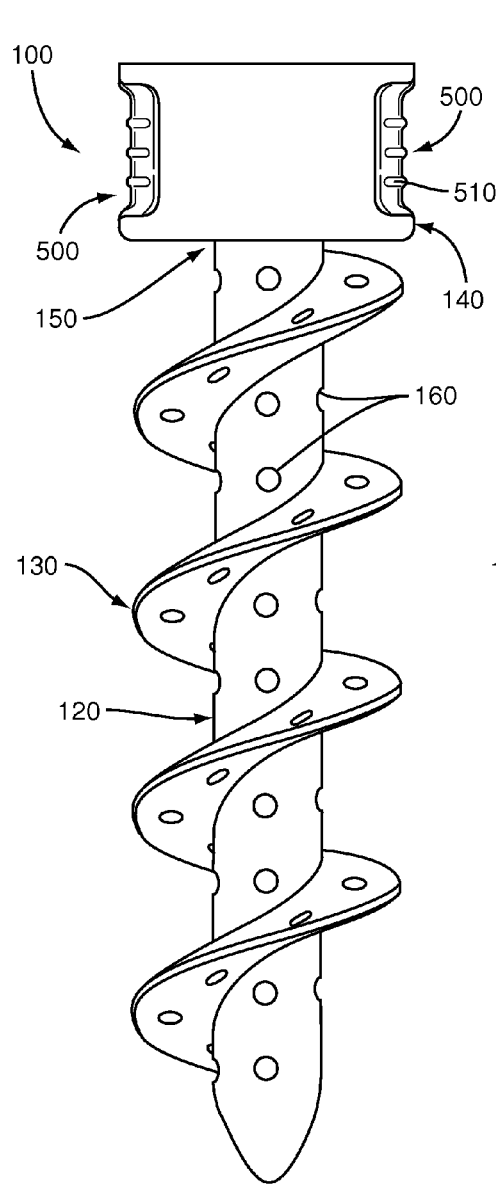
FIG. 5 illustrates an exterior view of yet another embodiment of the material dispensing device of FIG. 1.

FIG. 5 illustrates yet another embodiment of the material dispensing device including a tool receiving mechanism comprising a hand grip 500 disposed along the outer sidewall surface 320 of the receptacle 140. The shaft 120 and helical flange 130 are driven into the ground by engaging the hand grip 500 and rotating the receptacle 140 by hand. The hand grip 500 may have a roughened outer surface 510 for increasing the surface friction of the hand grip 500.

Figure 6:
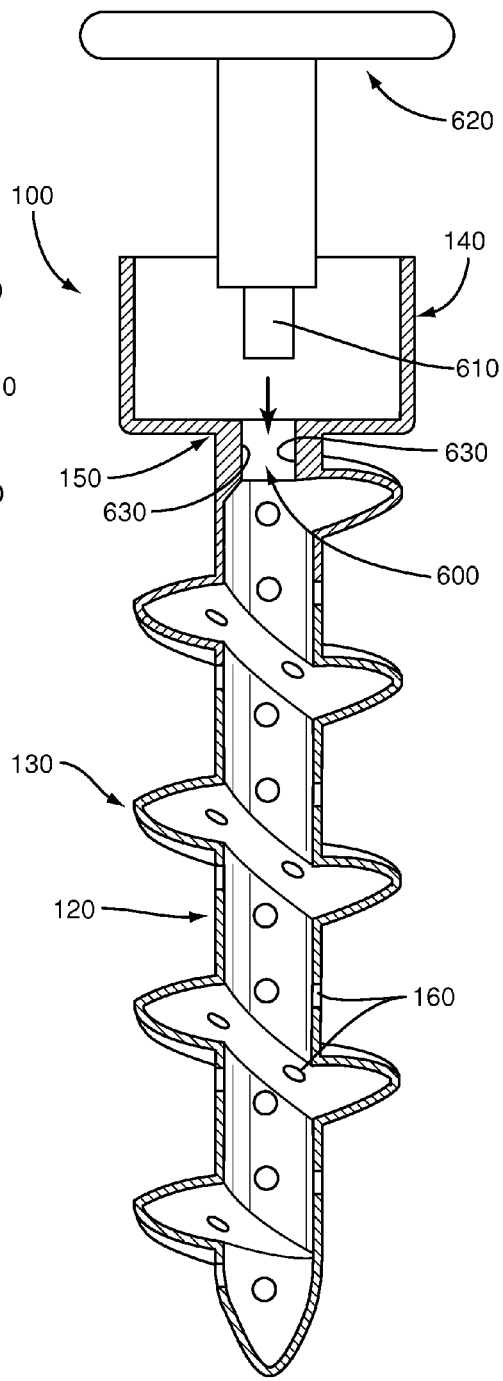
FIG. 6 illustrates a cross-sectional view of still another embodiment of the material dispensing device of FIG. 1.

FIG. 6 illustrates a cross-sectional view of still another embodiment of the material dispensing device 100 where the shaft end 150 disposed adjacent the receptacle 140 has an opening 600 shaped to receive a correspondingly mated end 610 of a tool 620. Sidewalls 630 of the shaft opening 600 engage the tool end 610 upon insertion of the tool end 610 in the opening 600. This way, rotation of the tool 620 drives the shaft 120 and helical flange 130 into the ground.

Figure 7:
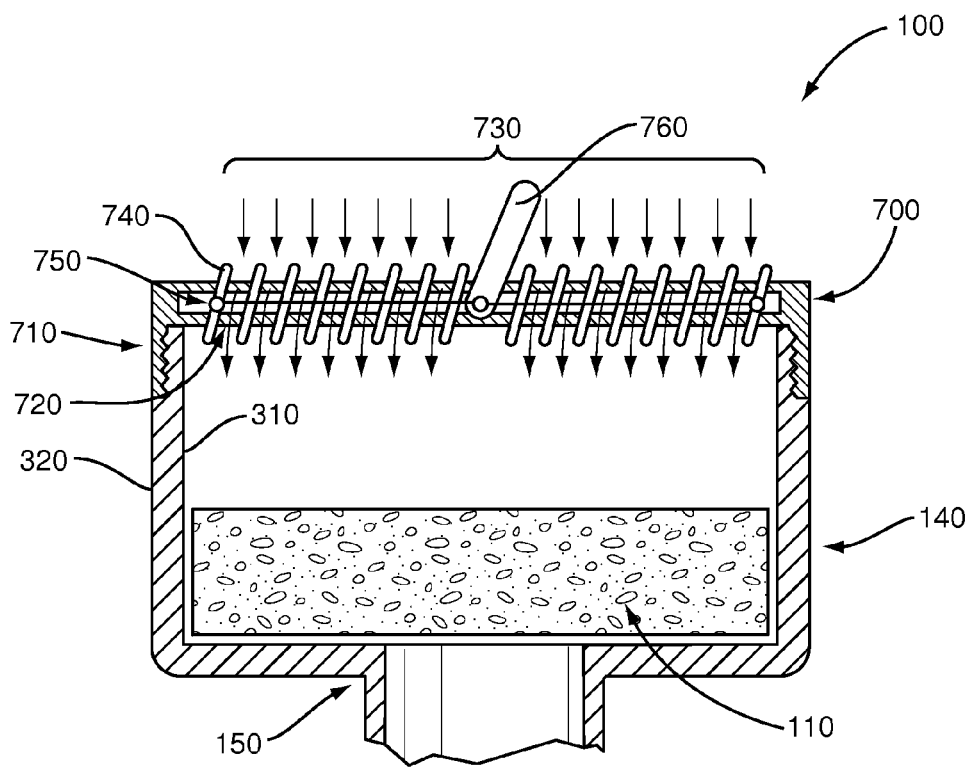
FIG. 7 illustrates a cross-sectional view of the receptacle portion of the material dispensing device of FIG. 1.

FIG. 7 illustrates another embodiment of the material dispensing device 100 where the device 100 includes a lid 700 for placement on the receptacle 140. In some embodiments, the lid 700 is removable, e.g., by pulling upward on the lid 700, twisting off the lid 700, or by rotating the lid 700 when the lid is screwed onto an upper region 710 of either the inner or outer sidewall surfaces 310, 320 of the receptacle 140 as shown in FIG. 7. In other embodiments, the lid 700 is permanently affixed to the receptacle 140. Regardless, the lid 700 may have one or more openings 720 for allowing a liquid 730 such as water to enter the receptacle 140, enabling the material 110 to dissolve at least in part into a liquid-material mixture.

The lid 700 may further include one or more flaps 740 for covering the openings 720 when the flaps 740 are in a closed position. In one embodiment, the flaps 740 actuate automatically, e.g., via a hinge mechanism 750, to cover the lid openings 720 when the receptacle 140 is full or nearly full, thus reducing the amount of liquid 730 entering the receptacle 140. According to this embodiment, the material 110 placed in the receptacle 140, the liquid 730 pouring into the receptacle 140, or a combination thereof pushes upward on the flaps 740, covering the lid openings 720 as the receptacle 140 fills. In another embodiment, the lid 700 includes a lever 760 for manually actuating the flaps 740 about the hinge mechanism 750.

Figure 8:
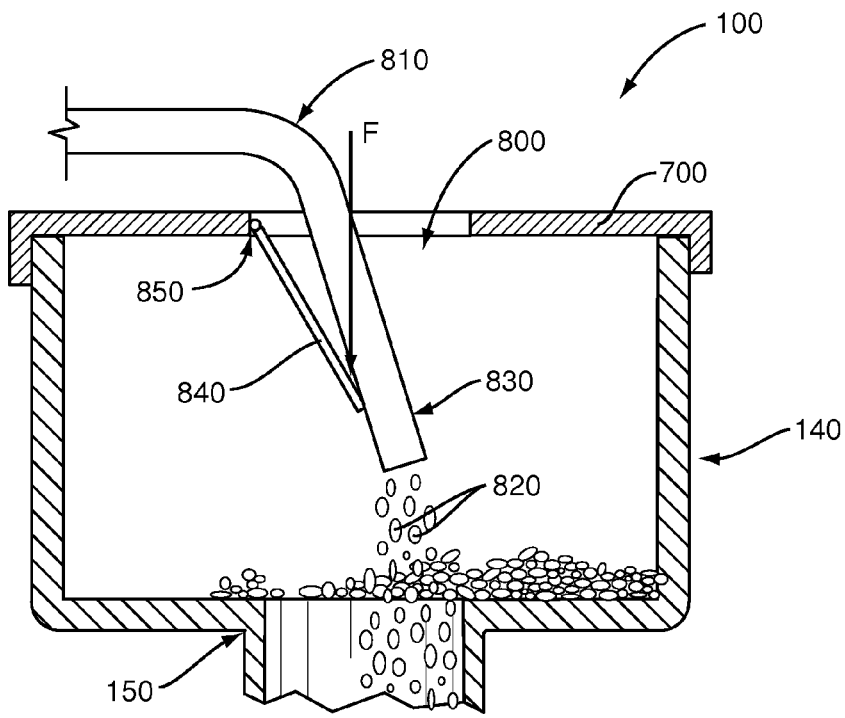
FIG. 8 illustrates a cross-sectional view of another embodiment of the receptacle portion of the material dispensing device of FIG. 1.

FIG. 8 illustrates yet another embodiment of the material dispensing device 100 where the lid 700 includes an opening 800 for receiving a device 810 containing material 820 to be dispensed into the receptacle 140. According to this embodiment, the material 820 is placed in the receptacle 140 by inserting an end 830 of the material containing device 810 into the receptacle 140 through the lid opening 800 instead of removing the lid 700. The material 820 is then released into the receptacle 140 by actuating the material containing device 810, e.g., by pulling a trigger or pushing a button (both not shown) on the device 810. Alternatively, the material 820 may be directly placed in the receptacle 140 through the opening 800 formed in the lid 700 or by removing the lid 700 and then placing the material 820 in the receptacle 140.

Regardless, the lid 700 may further include a cover 840 coupled to the lid 700 via a hinge mechanism 850 or other mechanism for covering the lid opening 800. The cover 840 opens inward into the receptacle 140 in response to the downward exertion of a force F against the cover 840, e.g., in response to the end 830 of the material containing device 810 or the material 820 itself being placed in the receptacle 140 through the lid opening 800. Otherwise, the cover 800 remains closed. In other embodiments, the cover 840 opens outwardly from the receptacle 140, e.g., by pulling on a handle (not shown) or other device disposed on the cover 840. Alternatively, the cover 840 may slidably engage the lid 700 so that the material 820 can be placed in the receptacle 140 by sliding the cover 840 in a first direction to expose the lid opening 800. The lid opening 800 can then be closed by sliding the cover 840 in the opposite direction over the opening 800.

Figure 9:
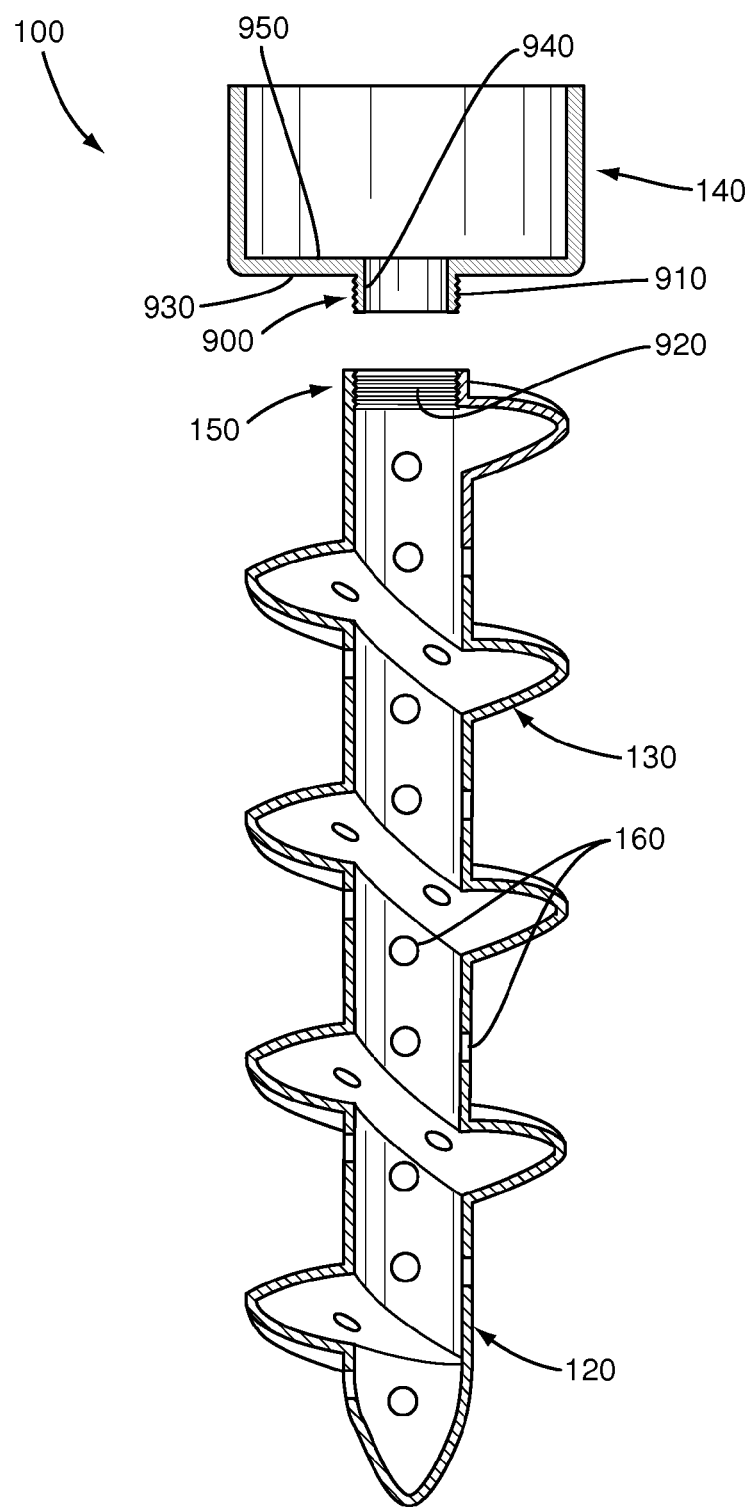
FIG. 9 illustrates a cross-sectional view of another embodiment of the material dispensing device of FIG. 1.

In one embodiment, the receptacle 140 and shaft 120 are integrally formed as shown in FIG. 1, e.g., via an injection molding process. FIG. 9 illustrates an alternative embodiment of the material dispensing device 100 where the receptacle 140 and shaft 120 are separate components. According to this embodiment, the receptacle 140 has a downwardly extending neck 900 having a threaded outer surface 910. The end 150 of the shaft 120 adjacent the receptacle 140 has a correspondingly inner mated threaded end 920 so that the receptacle 140 can be disposed adjacent one end 150 of the shaft 120 by screwing the receptacle neck 900 onto the shaft 120 via the mated threaded ends 910, 920.

The shaft end 150 may have female threads for receiving male threads formed on the receptacle neck 900 extending downward from a bottom surface 930 of the receptacle 140 as shown in FIG. 9. Alternatively, the thread genders may be switched. In yet other embodiments, the receptacle neck 900 has threads (not shown) disposed on an inner surface 940 of the receptacle neck 900 so that the shaft end 150 can be screwed into the neck 900 instead of the neck 900 being screwed onto the shaft end 150 as shown in FIG. 9.

Regardless, the receptacle neck 900 and shaft end 150 adjacent the receptacle 140 may be screwed together after the shaft 120 and helical flange 130 are driven into the ground. For example, one end of the shaft may have an opening shaped to receive the end of a tool as shown in FIG. 6 and previously described herein. Appropriate rotation of the tool drives the shaft 120 and helical flange 130 into the ground. The receptacle 140 can then be screwed onto the shaft end 150 via the mated threaded ends 910, 920.

The material dispensing device 100 may also include a trap (not shown) for limiting the amount of material 110/820 entering the shaft 120. In one embodiment, the trap is disposed in the shaft end 150 adjacent the receptacle 140. In another embodiment, the trap is disposed along an inside bottom surface 950 of the receptacle 140, covering the area where the receptacle 140 is communicatively open to the hollow shaft 120. Either way, the trap may be a screen that limits the size of solid material 110/820 entering the shaft 120, thus extending the material life while controlling the rate at which the material 110/820 is dissolved and dispersed into the ground.

Any type of material 110/820 may be placed in the receptacle 140 for dispersion into the ground. In one embodiment, the material 110/820 contains copper (e.g., copper sulfide, copper sulfate, or copper sulfite). According to this embodiment, the material dispensing device 100 may be used to retard root growth by dispersing the copper-containing material into the ground. For example, the material dispensing device 100 may be used near septic tanks, underground plumbing, foundations or other structures that are susceptible to root damage. In another embodiment, the material 110/820 is a fertilizer or other type of soil amendment. Broadly, the material 110/820 may be any substance or compound to be dispersed into the ground.

In one embodiment, the material 110/820 is dispersed into the ground by engaging the ground with the elongated hollow shaft 120 and helical flange 130. The shaft 120 and helical flange 130 are rotated to drive the shaft 120 and helical flange 130 into the ground. The material 110/820 is placed in the receptacle 140 and a liquid such as water is directed into the receptacle 140 to dissolve at least a portion of the material 110/820 to form a liquid-material mixture. The liquid-material mixture is channeled down the shaft 120 and dispersed into the ground through the openings 160 formed in the shaft 120 and/or helical flange 130.

Dispersing the material 110/820 or liquid-material mixture through the openings 160 formed in the flange 130 increases the lateral dispersion of the material into the ground because the flange 130 laterally extends beyond the diameter of the shaft 120. Both lateral dispersion and dispersion rate are increased when the openings 160 are disposed in both the shaft 120 and helical flange 130. According to this embodiment, both the helical flange 130 and shaft 120 are hollow so that the material 110/820 or liquid-material mixture disperses into the ground via openings 160 disposed in the shaft 120 and helical flange 130. Alternatively, only the shaft 120 has the openings 160. According to this embodiment, the helical flange 130 may be either solid or hollow.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A material dispensing device for dispersing material into the ground, comprising:
    an elongated shaft having a hollow interior region;
    a receptacle disposed adjacent one end of the shaft for holding material, the receptacle being in communication with the hollow interior region of the shaft such that the material or a liquid-material mixture dissolved from at least a portion of the material can flow from the receptacle into the shaft;
    a helical flange secured to the shaft, the helical flange comprising a single-lead thread having a root and a crest, the single-lead thread being wrapped around the shaft and having a hollow inner region between the root and the crest which is in communication with the hollow interior region of the shaft;
    one or more openings formed in the shaft or helical flange for dispersing the material or the liquid-material mixture into the ground; and
    wherein the shaft and helical flange are configured such that rotation of the shaft and flange causes the material dispensing device to be driven into the ground.

2. The material dispensing device of claim 1, further comprising at least one protrusion disposed adjacent an inner or outer sidewall surface of the receptacle, the at least one protrusion configured to receive an end of a tool operable to rotate the shaft and flange.

3. The material dispensing device of claim 1, further comprising at least one groove formed in an inner or outer sidewall surface of the receptacle, the at least one groove configured to receive an end of a tool operable to rotate the shaft and flange.

4. The material dispensing device of claim 3, wherein one or more of the grooves includes a slot configured to prevent removal of the tool from the groove.

5. The material dispensing device of claim 1, further comprising a hand grip disposed along an outer surface of the receptacle.

6. The material dispensing device of claim 1, wherein the end of the shaft disposed adjacent the receptacle has an opening shaped to receive a mated end of a tool operable to rotate the shaft and flange.

7. The material dispensing device of claim 1, wherein the shaft and the receptacle have mated threaded ends configured to secure the receptacle to the shaft when the mated threaded ends are screwed together.

8. The material dispensing device of claim 1, further comprising a lid configured for placement on the receptacle.

9. The material dispensing device of claim 8, wherein the lid is removable from the receptacle.

10. The material dispensing device of claim 8, wherein the lid includes one or more openings configured to allow a liquid to enter the receptacle.

11. The material dispensing device of claim 10, wherein the lid includes one or more flaps for reducing the amount of liquid entering the container through the one or more openings in the lid.

12. The material dispensing device of claim 11, wherein the lid includes a lever configured to actuate the one or more flaps.

13. The material dispensing device of claim 8, wherein the lid includes an opening configured to receive the material or an apparatus containing the material.

14. The apparatus of claim 13, wherein the lid includes a cover configured to prevent placement of the material in the receptacle through the opening in the lid when in a first position and to allow placement of the material in the receptacle through the opening in the lid when in a second position.

15. The material dispensing device of claim 1, wherein the material comprises a copper-containing material or a fertilizer.

16. A method of dispersing material into the ground from a dispensing device, comprising:
   engaging the ground with an elongated shaft having a hollow interior region and a helical flange secured to the shaft, the helical flange comprising a single-lead thread having a root and a crest, the single-lead thread being wrapped around the shaft and having a hollow inner region between the root and the crest which is in communication with the hollow interior region of the shaft;
   rotating the shaft and the helical flange to drive the shaft and helical flange into the ground;
   placing the material into a receptacle disposed adjacent one end of the shaft;
   directing liquid into the receptacle to dissolve at least a portion of the material to form a liquid-material mixture;
   channeling the liquid-material mixture down the shaft; and
   dispersing the liquid-material mixture into the ground through one or more openings formed in the shaft or helical flange.

17. The method of claim 16, wherein placing the material into a receptacle forming a part of the dispensing device comprises inserting the material or an apparatus containing the material into the receptacle through an opening formed in a lid covering the receptacle.

18. A method of dispersing copper-containing material into the ground from a dispensing device, comprising:
   engaging the ground with an elongated shaft having a hollow interior region and a helical flange secured to the shaft, the helical flange comprising a single-lead thread having a root and a crest, the single-lead thread being wrapped around the shaft and having a hollow inner region between the root and the crest which is in communication with the hollow interior region of the shaft;
   rotating the shaft and the helical flange to drive the shaft and helical flange into the ground;
   placing the copper-containing material into a receptacle disposed adjacent one end of the shaft;
   directing liquid into the receptacle to dissolve at least a portion of the copper-containing material to form a liquid-material mixture;
   channeling the liquid-material mixture down the shaft; and
   dispersing the liquid-material mixture into the ground through one or more openings formed in the shaft or helical flange for retarding root growth.

* * * * *